(No Model.)

J. W. GRAVES.
FOUNTAIN MARKING PEN.

No. 589,716.  Patented Sept. 7, 1897.

Witnesses  
J. G. Hinkel  
William E. Neff

Inventor  
John W. Graves  
By Watson & Watson  
Attorneys

UNITED STATES PATENT OFFICE.

JOHN W. GRAVES, OF CORDELE, GEORGIA.

FOUNTAIN MARKING-PEN.

SPECIFICATION forming part of Letters Patent No. 589,716, dated September 7, 1897.

Application filed October 30, 1896. Serial No. 610,604. (No model.)

*To all whom it may concern:*

Be it known that I, JOHN W. GRAVES, a citizen of the United States, residing at Cordele, in the county of Dooly and State of Georgia, have invented certain new and useful Improvements in Fountain-Pens, of which the following is a specification.

My invention relates to fountain pens and marking-brushes; and it consists in improvements in the reservoir-handle, in the means for regulating the flow of fluid to the pen or brush, and in other details of construction.

Figure 1:
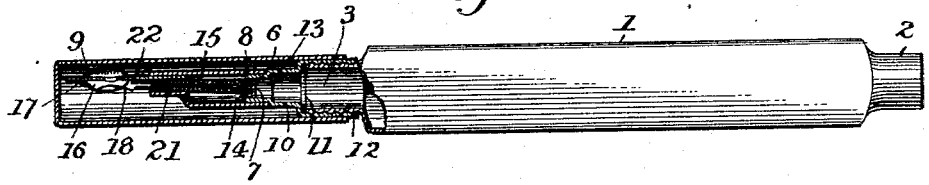
Figure 2:
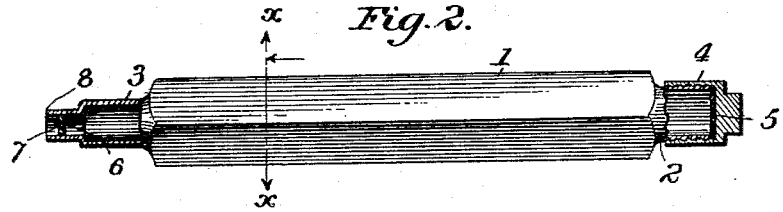
Figure 6:
Figure 5:
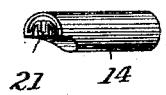
Figure 4:
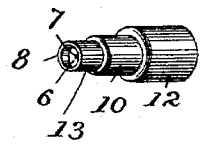
Figure 3:
Figure 7:
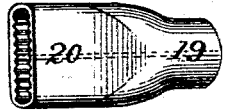
Figures 8, 12:
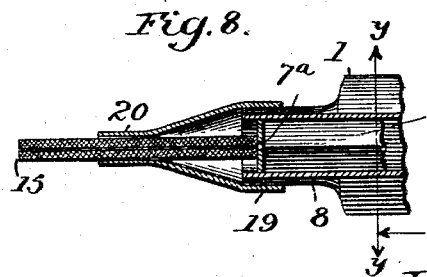
Figure 10:
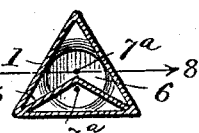
Figure 9:
Figure 11:

In the accompanying drawings, which form part of my specification, Figure 1 is a side view, partly in section, of a fountain-pen embodying my improvements. Fig. 2 is a similar view of a modified form of reservoir-handle. Fig. 3 is a cross-section on the line $x\ x$ of Fig. 2. Fig. 4 is a perspective view of the attachment shown in Fig. 1 for connecting the penholder to the reservoir-handle. Figs. 5 and 6 are perspective views of the penholder and pen, respectively, shown in Fig. 1. Fig. 7 is a similar view of a holder adapted to receive a flat pen or brush of felt or other suitable material. Fig. 8 is a sectional view of the holder shown in Fig. 7 applied to a modified form of reservoir-handle and provided with a flat fabric brush or pen, the handle shown being a section on the line 8 8 of Fig. 12. Figs. 9, 10, and 11 represent various forms of brushes or pens to be used in connection with the holder, shown in Figs. 7 and 8, and Fig. 12 is a section on the line $y\ y$ of Fig. 8.

Referring to the drawings, 1 indicates a reservoir-handle consisting of a tube preferably made of light elastic sheet metal, so as to be easily compressible by the fingers, and triangular in cross-section, so that it will fit easily between the thumb and first two fingers of the hand. The ends 2 3 of the tube are round. As shown in Fig. 2, the tube is open at the end 2 and is screw-threaded to receive a cap 4, having an internal packing 5, the cap being removable for the purpose of filling the reservoir. A plate or diaphragm 6 extends across the tube near the end 3, this plate being provided with a small perforation 7, preferably at or near its center. By means of the diaphragm the entire quantity of ink which is displaced in the holder is discharged through the perforation, whereas if the ink be discharged through a tube or channel a considerable quantity remains in the tube and is drawn back into the holder as soon as the pressure on the holder is relieved. As shown, the end 8 of the tube projects a short distance beyond the plate.

In the form shown in Fig. 1 the end 2 of the reservoir-handle is permanently closed and is adapted to receive the cap 9, which forms a protecting-sheath for the pen when not in use, as is common in fountain-pens. The end 3 of the handle is open, and it is screw-threaded externally to receive a fitting 10, provided with a perforated diaphragm 6 near its end similar to the diaphragm shown in Fig. 2. This fitting is provided with a packing-ring 11 to prevent leakage between the tube and fitting, and it is also formed with a portion 12, adapted to receive the sheath 9 when the pen is not in use, and with an extension 13, inclosing the plate or diaphragm 6 and adapted to receive the end of the penholder 14. The end 8 of the fitting extends slightly beyond the diaphragm.

The penholder may be of any form suitable for the style of pen or brush which it is desired to use. Within the holder I arrange a feeding device 15, consisting of a fabric, such as felt, the inner end of which abuts against the plate 6 opposite the perforation 7. The extension 8 surrounds the end of the fabric, and any of the liquid which might possibly run down the face of the plate 6 will be absorbed by the fabric in contact with the flange or extension 8. The feeding device may consist of the pen or brush itself, as shown in Fig. 8, whereby the liquid is conveyed directly to the writing-surface, or, as shown in Fig. 1, it may extend from the plate 6 to a pen or other marking point, and thus indirectly convey the ink from the reservoir to the writing-surface. As shown in Fig. 1, the holder 14 is provided with a pen 22 of ordinary construction, and the feeding fabric extends through a channel 21 in the penholder along the under side of the pen. Surrounding the pen is a small reservoir in the form of a sac 16, preferably made of rubber, and having openings 17 and 18 at opposite ends. These openings are elastic, the smaller one 17 fitting the point of the pen closely, so that no ink may pass through except when the points of the pen are spread apart, while the larger opening 18 fits the convex side of the pen-shank and leaves an opening between the sac and the concave side through which the feeder 15 may extend into the sac, or the ink may pass into the sac if the feeder 15 does not extend as far as the opening in the sac. The sac is easily applied by drawing it upon the pen, leaving the shank and point protruding.

The operation of the fountain-pen, as shown in Fig. 1, is as follows: When the pen is held in the hand in the natural position for writing, a very slight pressure upon any part of the reservoir-handle 1 will expel a drop of ink through the perforation 7, the ink being immediately absorbed by the fabric 15. As soon as the pressure upon the holder is relieved air will be drawn through the perforation to take the place of the expelled ink. This action may be repeated until the fabric is saturated, after which the involuntary movements of the fingers in writing will serve to compress the reservoir-handle and force out a sufficient supply for ordinary use. Any ink in excess of that required will collect in the sac 16, from which it will escape to the pen-point only when the pen is in use. By means of the sac a ready supply of ink is always upon the pen, and heavy shading or marking may be indulged in without exhausting the supply, as might occur upon such occasions if the feeding attachment alone were depended upon for the supply. The pen may be inverted without danger of spilling the contents of the sac 16, for the reason that the opening 17 closes whenever the pen is lifted from the writing-surface and no air will enter at that point.

The reservoir may be emptied or refilled by removing the fitting 10. In the form shown in Fig. 2 the reservoir is filled by removing the cap 4; otherwise the operation is similar to the preferred form shown in Fig. 1.

In Figs. 9, 10, and 11 I have shown several forms of marking pens or brushes, which I construct of fabric, preferably a hard felt. These marking-brushes preferably consist of two flat pieces of material which are laid together and inserted into a flattened holder, the ends of the fabric abutting against the plate 6 on either side of the perforation, as shown in Fig. 8. The form of brush shown in Fig. 9 is suitable for fancy shading and that shown in Fig. 10 for heavy shading, while that shown in Fig. 11 may be used for ruling. The holder shown in Fig. 7 is provided with a rounded shank 19 for connection with the handle and an internally-grooved flattened portion 20 for holding the fabric brushes or pens, the grooves permitting ventilation and the ingress of air to the perforation in the plate 6.

I prefer to make the reservoir-handle 1 of thin sheet metal, although it will be obvious that any other material which is elastic and answers the same purpose may be used. I also prefer to use a hard felt for the feeding device, but I may substitute any other fabric. It is essential to the operation of my fountain-pen that the feeding fabric be placed in proximity to the perforation in the diaphragm; otherwise the drop of liquid which is exuded by the pressure upon the holder would be immediately drawn back into the holder whenever the pressure is relieved. By placing the fabric so close to the perforation that the ink is absorbed by the fabric it cannot be drawn back into the reservoir.

In Figs. 8 and 12 I have illustrated a form of the holder adapted to receive two kinds or colors of ink. This holder in external appearance is like those shown in the other views, but there is an internal longitudinal partition 25, which separates it into two compartments, and in the diaphragm 6 there are two perforations 7$^a$. This form of holder is particularly adapted for lettering and shading purposes in connection with felt pens or brushes—such, for instance, as those shown in Figs. 9, 10, and 11. By charging the compartments with different colored inks or fluids whose menstruums are immiscible the two colors will flow through the felt and can be applied at one writing. The internal partition does not affect the flexibility or compressibility of the sides of the holder, as its edges are connected to the angles of the holder. In some instances I use a partition in the holder, as shown in dotted lines in Fig. 7, and divide the felt pen, as shown by dotted lines in Fig. 10, placing a part on each side of the partition in order to prevent mixture of the inks.

Having described my invention, what I claim, and desire to secure by Letters Patent, is—

1. A reservoir-handle for fountain pens and brushes consisting of a triangular tube suitably closed at one end and having a perforation at or near the other end, said tube having thin resilient flat walls adapted to be compressed in the act of writing, substantially as described.

2. A reservoir-handle for fountain pens and brushes consisting of a triangular tube suitably closed at one end and having at or near the other end a thin transverse diaphragm perforated so as to permit the liquid in the handle to pass out when the tube is compressed, said tube having thin resilient walls adapted to be compressed in the act of writing, substantially as described.

3. The combination with a reservoir-handle consisting of an angular compressible tube suitably closed at one end and having a perforation at or near the other end, of a holder adapted to fit the latter end, and a pen or brush composed of fabric, one end of said fabric fitting against the perforated end of the handle and receiving ink directly from said perforation, substantially as described.

4. In a fountain pen or brush, the combination with a compressible handle closed at one end and having a perforation at the other end, and a flange or projection extending beyond the perforated end, of a holder adapted to fit over the perforated end, and a feeding device within the holder, one end of which is in proximity to the perforation and is inclosed by the projection, substantially as described.

5. The combination with a reservoir-handle consisting of an angular compressible tube closed at one end and having a perforation in the opposite end, of a holder fitting the perforated end and a felt brush or pen carried by said holder and abutting against the perforated end of the handle, said holder having an internally-grooved flattened portion 20 in which the felt fits closely, substantially as described.

6. A reservoir-handle for fountain pens and brushes consisting of an angular compressible tube having an internal longitudinal partition, the edges of said partition being connected to the angles of the tube, substantially as described.

7. In combination, a reservoir-handle consisting of an angular compressible tube having an internal longitudinal partition dividing it into two compartments, the edges of said partition being connected to the angles of the tube, perforations at one end of each of said compartments, a holder fitting the perforated end of the handle, and a fabric brush or pen carried by said holder and having its inner end registering with the perforations of the handle, substantially as described.

8. In combination, a reservoir-handle consisting of an angular compressible tube having an internal longitudinal partition dividing it into two compartments, the edges of said partition being connected to the angles of the tube, perforations at one end of each of said compartments, a holder fitting the perforated end of the handle, said holder being divided longitudinally into two compartments, and a fabric pen or brush carried by each of said compartments, said brushes having their inner ends registering with the perforations of the handle, substantially as described.

In testimony whereof I affix my signature in presence of two witnesses.

JOHN W. GRAVES.

Witnesses:
W. H. DORRIS,
W. L. ROBUCK.